US011472914B2

(12) United States Patent
Khatake et al.

(10) Patent No.: US 11,472,914 B2
(45) Date of Patent: Oct. 18, 2022

(54) CARDANOL BASED CURING AGENT FOR EPOXY RESINS COMPOSITIONS

(71) Applicants: ELANTAS BECK INDIA LTD., Pimpri (IN); ELANTAS GMBH, Wesel (DE)

(72) Inventors: Singuribu Machindra Khatake, Pune (IN); Sunil Narsingrao Garaje, Pune (IN); Shashikant Sangmeshwar Paymalle, Pune (IN)

(73) Assignee: ELANTAS BECK INDIA LTD., Pimpri (IN)

( * ) Notice: Subject to any disclaimer, the term of this patent is extended or adjusted under 35 U.S.C. 154(b) by 0 days.

(21) Appl. No.: 17/049,366

(22) PCT Filed: Apr. 25, 2019

(86) PCT No.: PCT/EP2019/060691
§ 371 (c)(1),
(2) Date: Oct. 21, 2020

(87) PCT Pub. No.: WO2019/207080
PCT Pub. Date: Oct. 31, 2019

(65) Prior Publication Data
US 2021/0246258 A1   Aug. 12, 2021

(30) Foreign Application Priority Data

Apr. 26, 2018   (EP) .................... 18169665

(51) Int. Cl.
*C08G 59/50*   (2006.01)
*C08G 59/62*   (2006.01)
*C08G 59/54*   (2006.01)

(52) U.S. Cl.
CPC ........... *C08G 59/623* (2013.01); *C08G 59/54* (2013.01)

(58) Field of Classification Search
CPC .............................. C08G 59/623; C08G 59/54
USPC ....................................................... 525/490
See application file for complete search history.

(56) References Cited

U.S. PATENT DOCUMENTS

| | | |
|---|---|---|
| 3,864,426 A | 2/1975 | Salensky |
| 4,101,459 A | 7/1978 | Andrews |
| 4,116,938 A | 9/1978 | Schulze et al. |
| 4,122,068 A | 10/1978 | Meyer |
| 4,164,520 A | 8/1979 | Klein et al. |
| 4,331,582 A | 5/1982 | Babayan |
| 4,500,691 A | 2/1985 | Stockinger et al. |
| 4,837,295 A | 6/1989 | Drain et al. |
| 5,541,000 A | 7/1996 | Hardy et al. |
| 6,229,054 B1 | 5/2001 | Dai et al. |
| 6,248,204 B1 | 6/2001 | Schutt |
| 6,262,148 B1 | 7/2001 | Cheng et al. |
| 6,846,868 B2 | 1/2005 | Oka et al. |
| 6,911,109 B2 | 6/2005 | Giroux et al. |
| 7,550,550 B2 | 6/2009 | Klein et al. |
| 8,293,132 B2 | 10/2012 | Sato et al. |
| 8,822,629 B2 | 9/2014 | Hwang et al. |
| 2010/0048827 A1 | 2/2010 | Walker et al. |
| 2012/0165466 A1 | 6/2012 | Nitto et al. |
| 2012/0177937 A1 | 7/2012 | Ogawa et al. |
| 2014/0275343 A1 | 9/2014 | Hefner, Jr. |
| 2015/0094400 A1 | 4/2015 | Zheng |
| 2017/0240691 A1 | 8/2017 | Zheng et al. |

FOREIGN PATENT DOCUMENTS

| | | |
|---|---|---|
| EP | 0501064 A2 | 9/1992 |
| EP | 1091926 A1 | 4/2001 |
| EP | 2123689 A1 | 11/2009 |
| WO | 2012082727 A1 | 6/2012 |
| WO | 2014067095 A1 | 5/2014 |

OTHER PUBLICATIONS

Balgude et al., "Synthesis and characterization of cardanol based reactive polyamide for epoxy coating application", Progress in Organic Coatings, 2017, vol. 104, p. 250-262 (Year: 2017).*
International Search Report and Written Opinion for International Application No. PCT/EP2019/060691 dated Jul. 23, 2019 (12 pages).
D. Balgude et al., "Synthesis and characterization of cardanol based reactive polyamidefor epoxy coating application," Progress in Organic Coatings, Elsevier BV, vol. 104 (2016) pp. 250-262.
Z. Ma et al., "Synthesis, curing kinetics, mechanical and thermal properties of novel cardanol-based curing agents with thiourea," RSC Adv., vol. 6, No. 107 (2016) pp. 105744-105754.
Yang Liu et al., "Synthesis and Curing Kinetics of Cardanol-Based Curing Agents for Epoxy Resin by In Situ Depolymerization of Paraformaldehyde," Journal of Polymer Science, Part A: Polymer Chemistry, 2014, 52, pp. 172-480.
Alessandro Gandini, "The irruption of polymers from renewable resources on the scene of macromolecular science and technology," Green Chem., 2011, 13, pp. 1061-1083.
Emilie Darroman et al., "New aromatic amine based on cardanol giving new biobased epoxy networks with cardanol," Eur. J Lipid Sci. Technol. 2015, 117, pp. 178-189.
X.-D. Fan et al., "Synthesis and Characterization of Ployamide Resins from Soy-Based Dimer Acids and Different Amides," Journal of Applied Polymer Science, vol. 68, Issue 2, pp. 305-314, 1998, Wiley Periodicals, Inc.
Francis Pardal et al., "Unsaturated Polyamides from Bio-Based Z-octadec-9-enedioic Acid," Macromolecular Chemistry and Physics, vol. 209, Issue 1, pp. 64-74, 2008, John Wiley & Sons, Ltd.

(Continued)

*Primary Examiner* — David T Karst
(74) *Attorney, Agent, or Firm* — Fitch, Even, Tabin & Flannery LLP

(57) ABSTRACT

The present invention relates to new compounds based on cardanol based which can be used as curing agents, compositions comprising the novel compounds, the manufacture of such compounds and of such compositions, and the use of these 5 compositions, in particular in a potting process in electrical and electronic components and devices.

14 Claims, No Drawings

(56) References Cited

OTHER PUBLICATIONS

Lucrezia Martino et al., "Bio-based polyamide 11: Synthesis, rheology and solid-state properties of star structures," European Polymer Journal, vol. 59, pp. 69-77, 2014, Elsevier Ltd.

* cited by examiner

CARDANOL BASED CURING AGENT FOR EPOXY RESINS COMPOSITIONS

The present invention relates to new compounds based on cardanol based which can be used as curing agents, compositions comprising the novel compounds, the manufacture of such compounds and of such compositions, and the use of these compositions, in particular in a potting process in electrical and electronic components and devices.

BACKGROUND OF THE INVENTION

Polyamide have some excellent properties such as good fabricability, mechanical properties, heat resistance, rigidity, abrasion resistance and chemical resistance. Due to these unique properties, polyamide extensively used as various component materials for automobile, electric, electronic industry. (see e.g., US2012/0177937 A1). Polyamides are prepared from a variety of carboxylic acids. Terephthalic acid and trimellitic acids comprising a benzene ring with carboxylate groups at the 1 and 4 positions, and at the 1, 2, and 4 positions respectively (see e.g., WO2012/082727A1). Generally, polyamides are prepared from starting materials derived from petroleum reacting diacids and diamines thereof. (see e.g., US2012/0165466A1, US8,822,629B2, US6,846,868B2 and Journal of Applied Polymer Science, Vol. 68, Issue 2, pp 305-314, [1998], Wiley Periodicals, Inc). Alternatively, polyamides can be prepared from biomass by microbial synthesis under fermentor-controlled conditions as described in WO2012/082727A1.

The synthesis of bio-based polyamide are available in few literature such as unsaturated polyamide produced from bio-Based Z-octadec-9-enedioic Acid (Macromolecular Chemistry and Physics, Volume 209, Issue 1, pp 64-74, [2008], John Wiley & Sons, Ltd). Bio based polyamide are also prepared from castor oil (European Polymer Journal, Volume 59, pp 69-77, [2014], Elsevier Ltd). The polyamide prepared from biobased cardanol is reported in the Progress in Organic Coatings, Volume 104, pp 250-262, [2017], Elsevier B.V.

In view of this, more attention was given to thermosetting materials derived from renewable resources, particularly for epoxy thermosets. Until now, only bio-based aromatic acids or anhydrides are used as epoxy curing agents and only few bio-based diamines are already industrially available but most of them are poorly soluble in most of solvents or produce harmful byproduct. Phenalkamine produce from Mannich reaction is known as a best bio-based curing agent for epoxy resin. Phenalkamine is produced from cardanol which is extracted from cashew nut shell liquid (CNSL), which is a non-edible byproduct of CNSL industries. It is really a promising aromatic renewable source available in large quantity (European Journal of Lipid Science and Technology, Vol. 117, pp 178-189, [2015], WILEY-VCH Verlag GmbH & Co. KGaA, Weinheim). According to the U.S. Pat. No. 6,229,054 B1, CNSL derivatives have many industrial uses in, for example, epoxy curing agents, phenolic resins, surfactants, and emulsion breakers.

Phenalkamine prepared from Mannich reactions by reacting cardanol (containing extract derived from cashew nutshell liquid), aldehyde such as formaldehyde and polyamine (U.S. Pat. No. 6,262,148 B1 and Journal of Polymer Science, Part A: Polymer Chemistry, Vol. 52, pp, 472-480, [2014], Wiley Periodicals, Inc.). Yet, phenalkamine have some drawback such as cured epoxy materials have very dark color and are instable. Therefore, the use of phenalkamine in epoxy resin is very limited (RSC Advances, Vol. 6, pp 105744-105754, [2016], Royal Society of Chemistry).

Balguade et al. (published in Progress in Organic Coatings, 2016) discloses the reaction of the hydrocarbon chain of cardanol with maleic anhydride and the use of the resulting product as a curing agent.

Due to uncertainty in petroleum markets and the limited amount of petroleum product available for future use, it would be desirable to have amide containing polymers or resins, which can be derived from starting materials that can be prepared from renewable resources.

The novel compounds of the present invention solve the problem described above. In fact, they allow to produce amide containing polymers, which can be produced from a starting material which is available in nature and it is not a petroleum derivative.

Furthermore, the novel compounds can be ontained in an in situ synthesis of the phenalkamine modified with amides and polyether modified phenalkamine modified with amides.

The composition comprising the compound of the invention cures fast and result in stable material.

Furthermore, the costs of the hardener system can be reduced by developing low cost phenalkamine compared to polyamide hardener.

The material resulting from the cured composition comprising the have a good resistance to thermal shock, good chemical resistivity and very low water absorption properties. Also the mechanical properties are good if compared to existing polyamide systems.

DETAILED DESCRIPTION OF THE INVENTION

The present invention relates to a compound comprising a substituted cardanol, wherein the hydrocarbon chain of the cardanol is substituted with at least one group having at least one amino-functional group having an active hydrogen linked to an amine group and at least one amide group; and the aromatic ring of the cardanol is substituted with at least one group having at least one amino-functional group having an active hydrogen linked to an amine group.

In another preferred embodiment of the compound of the invention, the group having at least one active hydrogen linked to an amine group comprises a secondary amine.

In another preferred embodiment of the compounds of the invention, each group comprising at least one active hydrogen linked to an amine group further comprises a group selected from alkyl, aryl, heteroaryl, cycloalkyl and heterocycloalkyl. More preferably, the compounds of the invention further comprise a group selected from alkyl and hetero cycloalkyl.

In a preferred embodiment of the compound of the invention, the group having at least one active hydrogen linked to an amine group further comprising at least one ether group.

In a preferred embodiment of the compound of the invention, the group further comprising at least one ether group comprises a polyether segment.

The invention further relates to a curable composition comprising anyone of the compounds of the invention and an amine reactive resin.

The amine reactive resin of the curable composition might also react with —OH groups.

Preferably, the amine active resin is an epoxy resin. More preferably, the epoxy resin has on average at least one epoxy group per molecule, preferably at least one glycidyl group per molecule.

In a further embodiment, the invention relates to the use of a compound of the invention for curing a composition comprising an amine reactive resin. Preferably an epoxy resin. More preferably the epoxy resin has on average at least one epoxy group per molecule, preferably at least one glycidyl group per molecule.

In a preferred embodiment, anyone of the compounds of the invention can be used in any curable composition in the described embodiments comprising an amine reactive resin.

More preferred epoxy resins are those epoxy resins having 1.8 epoxy groups per molecule.

Commercially available epoxy resins are suitable for being cured with the compounds of the invention. Preferably, the commercially available epoxy resins suitable for the invention are based on bisphenol A, bisphenol F or mixtures thereof.

In another embodiment, the invention relates to the use of the composition comprising the compound of the invention for potting electrical and electronic components or devices.

In another embodiment, the invention relates to the use of the compound of the invention in a composition for potting electrical and electronic components or devices.

In another embodiment, the invention relates to a process for preparing the compounds of the invention.

In another embodiment, the invention relates to a process for the preparation of anyone of the compounds of the invention comprising the steps of
a) reacting the cardanol with maleic anhydride in the presence of a catalyst;
b) Reacting the reaction product of step a) with at least one compound having at least one primary or secondary amine group in the presence of formaldehyde and a catalyst.

In a preferred embodiment, the primary or secondary amine further comprises an ether group, preferably a polyether segment.

In a preferred embodiment, the primary or secondary amine further comprises an ether group is a polyetheramine.

In another preferred embodiment, the primary and/or secondary amine group further comprises a group selected from alkyl, aryl, heteroaryl, cycloalkyl and heterocycloalkyl.

In a further preferred embodiment, the catalyst of step a) comprises a metal complex. Preferably, the metal is selected from the group consisting of a transition metal, preferably the transition metal complex is a transition metal complex solution. More preferably, the transition metal is Cobalt or Manganese. Most preferably the catalyst is a cobalt napthenate.

In another preferred embodiment, the catalyst of step b) is an acid compound, preferably oxalic acid.

In a further embodiment, the invention relates to a process for preparing an article or a material, comprising the steps of:
a. mixing an epoxy resin having on average at least one one epoxy group per molecule, preferably at least one glycidyl group per molecule, with the curing agent of anyone of claims 1 to 5
b. curing the mixture of step a.

In a further embodiment, the invention relates to an article obtained by a process comprising the steps of:
a. mixing an epoxy resin having on average at least one one epoxy group per molecule, preferably at least one glycidyl group per molecule, with the curing agent of anyone of claims 1 to 5
b. curing the mixture of step a.

In a further embodiment, the invention relates to a material obtained by a process comprising the steps of:
a. mixing an epoxy resin having on average at least one glycidyl group per molecule with the curing agent of anyone of claims 1 to 5
b. curing the mixture of step a.

Preferred compounds having primary and/or secondary amine groups used in the process of the invention are aliphatic amines, cycloaliphatic amines, heterocyclic amines, aromatic amines.

Accordingly, the compound comprising at least a primary or a secondary amine may further comprise a group selected from alkyl, aryl, heteroaryl, cycloalkyl and heterocycloalkyl.

Preferably the compounds comprising at least a primary or a secondary amine are selected from the group consisting of N-aminoethylpiperazine; diethylenetriamine; triethylenetetramine (TETA); tetraethylenepentamine; 2-methylpentamethylene; 1,3-pentanediamine; trimethylhexamethylene diamine; a polyamide; a polyamidoamine and combination of thereoftrimethylolpropane tris[poly(propylene glycol), amine terminated] ether, 2-(1-piperazinyl)ethylamine, 3-aminomethyl-3,5,5-trimethylcyclohexylamine, 3,6,9,12-tetraazatetradecane-1,14-diamine, tetraethylenepentamine and triethylenetetramine, 3,6-diazoctanethylenediamine, 3,6,9-triazaundecamethylenediamine, 1,3-bis(aminomethyl) benzene, 1,3-bis(aminomethyl)cyclohexane, 5-diethyl toluene-2,4-diamine and 3,5-diethyl toluene-2,6-diamine (mixture of the two isomers), 2,2'-(ethylenedioxy)bis (ethylamine), 1,6-diamino-2,2,4(2,4,4)-trimethylhexane, N'-(3-aminopropyl)-N,N-dimethylpropane-1,3-diamine, 4,4'-diaminodicyclohexylmethane, 1,2-cyclohexanediamine and mixtures thereof.

Preferred compounds having at least a primary or a secondary amine group further comprising at least one ether group are polyetheramines. Preferred polyetheramines of the invention preferably comprise at least one oxyethylene diamine segment, oxyethylene triamine segment or polyoxyethylene diamine segment. Polyetheramines of the invention preferably comprise at least one propylene oxide segment, ethylene oxide segment or a mixture of both.

Preferred polyetheramine used in the present invention are commercially available under the trademark JEFFAMINE from Huntsman Corporation, Houston, Tex. such as, JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJ-509, JEFFAMINE T-3000, JEFFAMINE T-5000, and combinations thereof. Preferred polyetheramines of the invention are JEFFAMINE® D-230.

Cured composition in this invention may further comprise inorganic and/or organic fillers. Suitable inorganic fillers include barium sulfate, silica, aluminum oxide, calcium oxide, magnesium oxide, sodium oxide, potassium oxide, iron oxide, titanium oxide, other oxides or mixtures thereof. Other suitable fillers include silica-gels, calcium silicates, calcium nitrate, calcium phosphates, calcium molybdates, calcium carbonate, calcium hydroxide, fumed silica, clays such as bentonite, aluminium trihydrates, magnesium dihydrates, glass microspheres, hollow glass microspheres, polymeric microspheres, and hollow polymeric microspheres. Organic fillers such as aramid fibers and polyolefin fibers such as polyethylene fibers can be used in the curable composition.

The curable composition can contain any suitable amount of the filler. It may contains 0.01 to 50 weight percent filler based on a total weight of the curable composition.

The compounds of the inventions can be used for curing a composition comprising an amine reactive resin, preferably an epoxy resin, more preferably, the epoxy resin has on average at least one glycidyl group per molecule.

The invention further relates to a process for preparing the compounds of the invention. The process comprises the steps of reacting the cardanol and/or bisphenol with at least one compound having at least one primary or secondary amine group and one compound having at least one primary or secondary amine group further comprising an ether group in the presence of formaldehyde and a catalyst.

The invention further relates to a process for preparing an article or material comprising the step of mixing an amine reactive resin, preferably an epoxy resin, with the compound of the invention and curing the mixture.

Another object of the invention are the articles or materials produced by the process comprising the step of mixing an amine reactive resin with the compound of the invention and curing the mixture.

The present invention is explained in more details by the following non-limiting examples.

EXAMPLES

The phenalkamine of the invention were synthetized analogously to the synthesis procedure given in the U.S. Pat. No. 6,262,148 B1 and Journal of Polymer Science, Part A: Polymer Chemistry, Vol. 52, pp, 472-480, [2014], Wiley Periodicals, Inc.

The reaction of cardanol with maleic anhydride was performed analogously to Balguade et al. (published in Progress in Organic Coatings, 2016).

Example 1

Preparation of Intermediate 1 Obtained by Using Cardanol and Maleic Anhydride.

Three liter reaction flask is charged with the following ingredients:
  1600.00 g of Cardanol
  392.24 g of Maleic anhydride
  10 g of 5-10% solid solution of cobalt naphthenate as a catalyst In a three liter reaction flask with a water cooled reflux condenser, 1600 g of cardanol and 392.24 g of maleic anhydride were added under stirring. 10 g of cobalt naphthenate was added to the mixture under stirring. This mixture was heated slowly to 190° C. under continuous stirring for 2:5 hours duration.

Example 2.1

Preparation of Cardanol Based Polyamide by Using Intermediate 1 and TETA (Triethylenetetramine).

One liter reaction flask was charged with the following ingredients:
  228 g of hydrolyzed malenized cardanol
  130 g of TETA (Triethylenetetramine)
  43 g of DETA (Diethylenetriamine)
  100 g of SOFA (Soya Acid Fatty Acid)
  0.2 g of oxalic acid (catalyst)

In a one liter reaction flask with a water cooled reflux condenser, 228 g of hydrolyzed malenized cardanol and 130 g of TETA, 43 g of DETA and 100 g of SOFA were added under stirring. 0.2 g of oxalic acid were further added under stirring. This mixture was heated slowly to 210° C. under continuous stirring for 2.5 hours duration. At this temperature, a clear mixture was obtained which indicating a complete reaction took place. The residual water present in mixture was removed by applying vacuum of 650 mm/Hg for 1 hour duration to the system.

Example 2.2

Preparation of Cardanol Based Polyamide by Using Intermediate 1 and TEPA (Tetraethylenepentamine).

One liter reaction flask was charged with the following ingredients:
  228 g of hydrolyzed malenized cardanol
  145 g of TEPA (Tetraethylenepentamine)
  43 g of DETA (Diethylenetriamine)
  100 g of SOFA (Soya Acid Fatty Acid)
  0.2 g of oxalic acid (catalyst)

The above same procedure used for the synthesis of cardanol based polyamide by using hydrolyzed malenized cardanol and TEPA (Tetraethylenepentamine).

Example 2.3

Preparation of Cardanol Based Polyamide by Using Intermediate 1 and AEP (Aminoethylpiperazine).

One liter reaction flask was charged with the following ingredients:
  228 g of hydrolyzed malenized cardanol
  147 g of AEP (Aminoethylpiperazine)
  43 g of DETA (Diethylenetriamine)
  100 g of SOFA (Soya Acid Fatty Acid)
  0.2 g of oxalic acid (catalyst)

The above same procedure used for the synthesis of cardanol based polyamide by using hydrolyzed malenized cardanol and AEP (Aminoethylpiperazine).

Example 3.1

Preparation of Polyamide-Phenalkamine Based Curing Agent by Using Intermediate 1, TETA (Triethylenetetramine) and Paraformaldehyde.

In one liter reaction flask following ingredients was charged to prepare a polyamide-phenalkamine based curing agent by using TETA:
  180 g of hydrolyzed malenized cardanol
  5 g of Paraformaldehyde
  102 g of TETA (Triethylenetetramine)
  35 g of DETA (Diethylenetriamine)
  78 g of SOFA (Soya Acid Fatty Acid)
  0.2 g of oxalic acid (catalyst)

All the above additive were charged in one liter reaction flask with a water cooled reflux condenser under continuous stirring and heated slowly to 180° C. with continuous stirring for 2.5 hours duration. After completion of reaction, residual water present in mixture is removed by applying vacuum of 650 mm/Hg for 1 hour duration to the system.

Example 3.2

Preparation of Polyamide-Phenalkamine Based Curing Agent by Using Intermediate 1, TEPA (Tetraethylenepentamine) and Paraformaldehyde.

In one liter reaction flask following ingredients was charged to prepare a polyamide-phenalkamine based curing agent by using TEPA:
  180 g of hydrolyzed malenized cardanol
  5 g of Paraformaldehyde
  119 g of TEPA (Tetraethylenepentamine)

35 g of DETA (Diethylenetriamine)
78 g of SOFA (Soya Acid Fatty Acid)
0.2 g of oxalic acid (catalyst)

The above same procedure was used for the synthesis of polyamide-phenalkamine by using TETA.

Example 3.3

Preparation of Polyamide-Phenalkamine Based Curing Agent by Using Intermediate 1, AEP (Aminoethylpiperazine) and Paraformaldehyde.

In one liter reaction flask following ingredients was charged to prepare a polyamide-phenalkamine based curing agent by using AEP:
180 g of hydrolyzed malenized cardanol
5 g of Paraformaldehyde
112 g of AEP (Aminoethylpiperazine)
35 g of DETA (Diethylenetriamine)
78 g of SOFA (Soya Acid Fatty Acid)
0.2 g of oxalic acid (catalyst)

The above same procedure was used for the synthesis of polyamide-phenalkamine by AEP.

Example 4.1

Preparation of Polyetheramine Modified Polyamide-Phenalkamine by Using Cardanol Based Polyamide Prepared from TETA, Paraformaldehyde and Polyetheramine.

In one liter reaction flask following ingredients was charged to prepare a polyetheramine modified polyamide-phenalkamine based curing agent:
250 g of Cardanol based polyamide prepared from TETA
11.60 g of Paraformaldehyde
125 g of Jeffamine D 230 polyetheramine
0.2 g of oxalic acid (catalyst)

All the above additive were charged in three liter reaction flask with a water cooled reflux condenser under continuous stirring and heated slowly to 120° C. with continuous stirring for 2.5 hours duration. After completion of reaction, residual water present in mixture was removed by applying vacuum of 650 mm/Hg for 1 hour duration to the system.

Example 4.2

Preparation of Polyetheramine Modified Polyamide-Phenalkamine by Using Cardanol Based Polyamide Prepared from TEPA, Paraformaldehyde and Polyetheramine.

In one liter reaction flask following ingredients was charged to prepare a polyetheramine modified polyamide-phenalkamine based curing agent:
250 g of Cardanol based polyamide prepared from TEPA
11.60 g of Paraformaldehyde
125 g of polyetheramine Jeffamine D 230
0.2 g of oxalic acid (catalyst)

The above same procedure was used for the synthesis of polyetheramine modified polyamide-phenalkamine prepared from cardanol based polyamide prepared from TEPA, paraformaldehyde and polyetheramine.

Example 4.3

Preparation of Polyetheramine Modified Polyamide-Phenalkamine by Using Cardanol Based Polyamide Prepared from AEP, Paraformaldehyde and Polyetheramine.

In one liter reaction flask following ingredients was charged to prepare a polyetheramine modified polyamide-phenalkamine based curing agent:
250 g of Cardanol based polyamide prepared from AEP
11.60 g of Paraformaldehyde
125 g of polyetheramine Jeffamine D 230
0.2 g of oxalic acid (catalyst)

The above same procedure was used for the synthesis of polyetheramine modified polyamide-phenalkamine prepared from cardanol based polyamide prepared from AEP, paraformaldehyde and polyetheramine.

Example 5

Preparation of Cured Material by Using Cardanol based Polyamide/Polyamide-Phenalkamine/Polyetheramine Modified Polyamide-Phenalkamine with Epoxy Resin The epoxy resin Diglycidyl Ether of Bisphenol A was mixed with each of all above Examples 2.1, 2.2, 2.3, 3.1, 3.2, 3.3, 4.1, 4.2 and 4.3, respectively. The mixtures were degases at 650 mm/Hg for 15 minutes and afterwards poured in suitable container at room temperature for 3 hours to form a thermoset.

All the thermosets, i.e., cured materials, obtained in Example 5 passed 10 thermal cycle test at (−40/100° C.) for 1 hour.

Comparison of physical properties of above newly developed system with standard polyamide based curing agent.

|  | Viscosity at 25° C. in cP | Amine Value in mg KOH/g | Final performance property Hardness (Shore D) |
|---|---|---|---|
| Standard Polyamide | 10000 | 380 | 80-85 |
| Ex. 2.1 | 6500 | 370 | 80-85 |
| Ex. 2.2 | 12000 | 374 | 80-85 |
| Ex. 2.3 | 6700 | 390 | 80-85 |
| Ex. 3.1 | 10000 | 380 | 80-85 |
| Ex 3.2 | 17000 | 390 | 80-85 |
| Ex. 3.3 | 11000 | 370 | 80-85 |
| Ex 4.1 | 1300 | 385 | 80-85 |
| Ex. 4.2 | 1800 | 370 | 80-85 |
| Ex. 4.3 | 11500 | 387 | 80-85 |

Methods

The properties summarized in Table 2 above were measured applying the following methods.

The viscosity was measured at a temperature of 25° C. [in cP] using the BROOKFIELD viscometer, spindle number 27 at share rate of 10 rpm.

The Amine Value in mg KOH/g was measured using the below method:

Reagents:—Glacial acetic acid

Perchloric acid in glacial acetic acid 0.1 N standardised.

Crystal violet indicator solution. (dissolve 1.0 g crystal violet in 100 ml glacial acetic acid.)

Apparatus:Idometric flack—capacity 250 ml

Graduated glass cylinder capacity 50 ml

Burette—capacity 25 ml (min dev.0.1 ml)

Precision balance.

Procedure: 1. Weigh accurately 0.3-0.5 g sample in a clean & dry idometric flask.

2. Dissolve in about 50 ml glacial acetic acid worm if necessary, cool to room temp.

3. Titrate against standardised perchloric acid using crystal violet indicator solution till colour change from violet to green.
4. Note the reading (R ml)

Calculation:

$$\text{Amine value} = \frac{56.1 \times N \times R}{\text{Weight of sample}}$$

N=Normality of perchloric acid
R=ml of perchloric acid required.

The Gel Time was measured at a temperature of in Minutes (Mixing ratio of resin and hardener: 65:35) using gelation timer (TECHNE instrument).

The Glass Transition Temperature (Tg/° C.) was measured using the Metter Toledo at a rate of 10° C./min in air (25° C. to 600° C.).

The Hardness (Shore D) was measured using the DUROMETER FROM HIROMETER at 25° C.

The thermal shock cycles were performed using the CM Envirosystem, model Kinetic 25 B2 at −40/100° C. No. of Thermal Cycle Passed at −40/100° C. for 1 hour duration each.

The invention claimed is:

1. A compound comprising a substituted cardanol, wherein
    the substituted cardanol comprises a hydrocarbon chain substituted with at least one group comprising at least one amide group and at least one amino-functional group comprising an active hydrogen linked to an amine group; and
    at least one of the hydrogens on the aromatic ring of the cardanol is substituted with at least one group comprising at least one amino-functional group comprising an active hydrogen linked to an amine group, such that the aromatic ring is directly substituted with said at least one amino-functional group.

2. The compound of claim 1, wherein a group of the at least one amino-functional group substituted on the hydrocarbon chain and the at least one amino-functional group substituted on the aromatic ring comprises a secondary amine.

3. The compound of claim 2, wherein each group comprising an active hydrogen linked to an amine group further comprises an alkyl group, an aryl group, a heteroaryl group, a cycloalkyl group, or a heterocycloalkyl group.

4. The compound of claim 1, wherein one or more of the at least one amino-functional group substituted on the hydrocarbon chain and the at least one amino-functional group substituted on the aromatic ring further comprises at least one ether group.

5. The compound of claim 4, wherein the group further comprising at least one ether group comprises a polyether segment.

6. A curable composition comprising the compound of claim 1 and an amine reactive resin.

7. The curable composition of claim 6, wherein the amine reactive resin is an epoxy resin.

8. An electrical device comprising a potted component including a cured form of the curable composition of claim 6.

9. An electronic device comprising a potted component including a cured form of the curable composition of claim 6.

10. A process for preparing a curing agent, the process comprising:
    reacting a cardanol with maleic anhydride in the presence of a catalyst; and
    in the presence of formaldehyde or paraformaldehyde and a catalyst, reacting a reaction product of the cardanol and maleic anhydride with at least one compound comprising at least one of a primary amine group and a secondary amine group, at least one of the hydrogens on the aromatic ring of the resulting substituted cardanol being substituted with at least one group comprising at least one amino-functional group comprising an active hydrogen linked to an amine group, such that the aromatic ring is directly substituted with said at least one amino-functional group.

11. The process of claim 10, wherein the at least one of a primary amine group and a secondary amine group further comprises an ether group.

12. The process of claim 11, wherein the ether group is comprised in a polyetheramine.

13. A process for preparing an article or a material, the process comprising:
    forming a mixture including an amine reactive resin and a curing agent, the curing agent comprising a substituted cardanol, wherein the substituted cardanol comprises a hydrocarbon chain substituted with at least one group comprising at least one amide group and at least one amino-functional group comprising an active hydrogen linked to an amine group, and the substituted cardanol comprises an aromatic ring, at least one of the hydrogens on the aromatic ring being substituted with at least one group comprising at least one amino-functional group comprising an active hydrogen linked to an amine group, such that the aromatic ring is directly substituted with said at least one amino-functional group; and
    curing the mixture.

14. A material obtained by the process of claim 13.

* * * * *